3,053,844
MONO-ACYL DERIVATIVES OF s-TRIAZOLO
[2,3-c] PYRIMIDINES
George William Miller and Francis Leslie Rose, Macclesfield, England, assignors to Imperial Chemical Industries Limited, London, England, a corporation of Great Britain
No Drawing. Filed Mar. 21, 1960, Ser. No. 16,123
Claims priority, application Great Britain Apr. 13, 1959
7 Claims. (Cl. 260—256.4)

This invention relates to heterocyclic compounds and more particularly it relates to pyrimidine derivatives which possess valuable therapeutic properties.

According to the invention we provide monoacyl derivatives of compounds which, in one tautomeric form, have the formula:

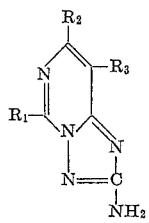

wherein $R_1$, $R_2$ and $R_3$, which may be the same or different, stand for hydrogen or for alkyl, optionally substituted by alkoxy or halogen radicals, or for alkenyl, cycloalkyl, alkylthio or halogeno radicals, or $R_2$ and $R_3$ may be joined together to form a polymethylene radical and wherein the mono-acyl radical is represented by the formula

—$COR_4$ wherein $R_4$ stands for hydrogen or for an alkyl radical, optionally substituted, an aryl radical, optionally substituted, an alkenyl radical, optionally substituted, or an aralkenyl or alkoxy radical, and the salts thereof.

It is to be understood that the compounds used as starting material are capable of tautomerism according to the formulae:

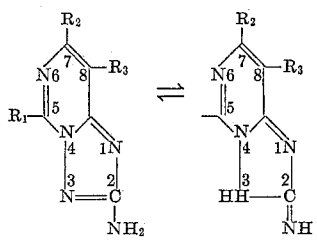

wherein $R_1$ $R_2$ and $R_3$ have the meanings stated above, and therefore the mono-acyl derivatives of this invention may be represented as 2-acyl amino derivatives or 3-acyl derivatives. We believe that, on the basis of the chemical and physical data available to us, the said mono-acyl derivatives have the structural formula of 2-acylamino derivatives.

As examples of the substituents $R_1$, $R_2$ and $R_3$ there may be mentioned for example alkyl radicals each containing up to 7 carbon atoms, optionally substituted by fluorine, chlorine, methoxy or ethoxy radicals, the allyl radical, the cyclohexyl radical, methylthio or ethylthio radicals, and chlorine or bromine radicals. As examples of the substituent $R_4$ there may be mentioned for example an alkyl radical, optionaly substituted by halogen or a phenoxy radical, a phenyl radical, optionally substituted by nitro or methoxy radicals, an alkenyl radical optionally substituted by a carboxyl radical for example β-carboxyvinyl, a methoxy radical, an ethoxy radical and a β-phenylvinyl radical.

Preferred compounds are those wherein the substituent ($R_3$) stands for hydrogen, the substituents ($R_1$ and $R_2$), the same or different, stand for alkyl radicals and the substituent ($R_4$) stands for hydrogen or for a methyl, ethyl, ethoxy or phenyl radical. Particularly valuable compounds are those wherein the substituent ($R_3$) stands for hydrogen, the substituents ($R_1$ and $R_2$), which may be the same or different, stand for methyl, ethyl, n-propyl or n-butyl radicals and the substituent ($R_4$) stands for hydrogen or for a lower alkyl radical especially a methyl or ethyl radical.

A preferred group of compounds includes 2-acetamido-, 2-formamido-, 2-propionamido-, 2-benzamido- and 2-ethoxycarbonylamido-7-methyl-5-n-propyl-s-triazolo - [2, 3-c]pyrimidine and 2-acetamido-5:7-di-n-propyl-s-triazolo-[2,3-c]pyrimidine and of these, a most valuable compound is 2-acetamido-7-methyl-5-n-propyl-s-triazolo-[2,3-c]pyrimidine.

Suitable salts of the compounds of this invention are salts with a strong base for example with alkali metal hydroxides or with a strong organic base.

According to a further feature of the invention we provide a process for the manufacture of the said monoacyl derivatives which comprises interaction of a compound which, in one of its tautomeric forms, has the formula:

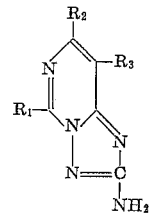

wherein $R_1$, $R_2$ and $R_3$ have the meaning stated above, and an appropriate acylating agent, followed, if desired, by conversion to a salt by known means.

The said acylating agent may be selected from the group consisting of compounds of the formulae $R_4COOH$, $R_4COY$ and $(R_4CO)_2O$ wherein $R_4$ has the meaning stated above and Y stands for a halogen atom.

Thus as suitable acylating agents there may be mentioned for example formic acid, acetic anhydride, propionic anhydride, n-butyric anhydride, trifluoroacetic anhydride, benzoic anhydride, maleic anhydride, acetyl chloride, n-butyryl chloride, pivalyl chloride, stearyl chloride, benzoyl chloride and cinnamyl chloride.

The said reaction may be carried out in the presence of a suitable solvent or diluent for example a lower aliphatic acid for example acetic acid or propionic acid, or dioxan or chloroform. The solvent or diluent may conveniently be an organic base for example pyridine whereby it may act also as an acid-binding agent. The process may be accelerated or completed by the application of heat.

The compounds which, in one tautomeric form, have the formula:

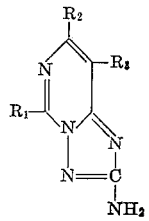

wherein $R_1$, $R_2$ and $R_3$ have the meaning stated above, which are used as starting materials in the above process, may be obtained, as described in our co-pending U.S.

application Serial No. 838,413, filed September 8, 1959, by the interaction of a compound of the formula:

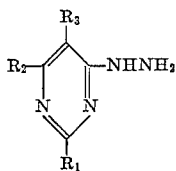

wherein $R_1$, $R_2$ and $R_3$ have the meaning stated above, or a salt thereof, with a cyanogen halide under essentially acidic reaction conditions.

The hydrazinopyrimidine derivatives used as starting materials may be obtained by interaction of the corresponding halogenopyrimidines, for example the corresponding chloropyrimidines, and hydrazine, conveniently in the presence of a diluent or solvent, for example water, ethanol or β-ethoxyethanol. The halogenopyrimidines themselves may be obtained by interaction of the corresponding hydroxypyrimidines and a phosphorus oxyhalide for example phosphorus oxychloride.

The compounds of the present invention are valuable in that they possess a variety of therapeutic properties. Thus they are bronchodilators and respiratory stimulants and are therefore useful in the treatment of asthma and other respiratory dysfunctions. They inhibit the formation of granulomata and are therefore useful in the treatment of rheumatoid arthritis. They also possess sedative, analgesic and hypotensive properties.

According to a further feature of the invention therefore we provide pharmaceutical compositions comprising as active ingredient one or more of the monoacyl derivatives of the compounds of the formula stated above, or a salt thereof, in admixture with a non-toxic pharmaceutical carrier or diluent therefor.

Particularly useful compositions are oral compositions by which the active ingredient can be administered in the form of a solid composition for example as a tablet, pill or capsule, or a liquid composition for example as a solution, syrup or suspension or as a dispersible powder. The said compositions are preferably formulated so that when the compositions are used as bronchodilators, or analgesics, each dosage unit contains between 1 mg. and 500 mg., preferably between 10 mg. and 100 mg. of active ingredient and when the compositions are used in the treatment of rheumatoid arthritis, each dosage unit contains between 10 mg. and 750 mg., preferably between 200 mg. and 500 mg. of active ingredient.

The pharmaceutical compositions may also be in a form suitable for parenteral administration for example as an injectable solution or suspension in an aqueous or oily medium, or as a sterile powder or dispersible powder from which an injectable solution or suspension can be prepared.

The pharmaceutical compositions may also be in a form suitable for topical application for example as powders for insufflation, as sprays for inhalation or as an aerosol preparation.

The said compositions may optionally contain in addition one or more known drugs. These known drugs may include for example an antihistamine or other antiinflammatory agent for example 9-(2-dimethylaminopropyl-10-thia-1:9-diaza-anthracene, prednisolone or hydrocortisone, a sedative for example phenobarbitone or an antibacterial agent for example sulphadimidine or penicillin V.

The compound 2-acetamido-7-methyl-5-n-propyl-s-triazolo-[2,3-c]pyrimidine has been administered in single daily doses or two or three times daily to patients suffering from asthma or chronic bronchitis in which there was an occurrence of bronchospasm. The results obtained show that the said compound possesses pronounced broncodilator activity in those patients suffering from bronchial constriction.

The invention is illustrated but not limited by the following examples in which the parts are by weight:

*Example 1*

1 part of 2-amine-5-ethyl-7-methyl-s-triazolo-[2,3-c] pyrimidine and 14 parts of acetic anhydride are heated under reflux during 30 minutes. The solution is then cooled to 0° C. and the mixture so obtained is filtered. The solid residue is washed with cold ethanol and is crystallised from ethanol. There is thus obtained 2-acetamido - 5 - ethyl - 7 - methyl-s-triazolo - [2,3-c]pyrimidine as a colorless crystalline solid, M.P. 184–185° C.

The 2-amino-5-ethyl-7-methyl-s-triazolo-[2,3-c]pyrimidine, used as starting material may be obtained as follows:

36 parts of 2-ethyl-6-hydrazino-4-methylpyrimidine are dissolved in 237 parts of 1-N aqueous hydrochloric acid at 25° C. A stream of cyanogen chloride, previously washed with water, is bubbled through the solution, which is maintained at 25–30° C. until 16 parts of the gas are absorbed. The resulting solution is sealed and allowed to stand for one hour at 18–22° C. Excess cyanogen chloride is then removed by evaporation under reduced pressure at 18–22° C. 100 parts of crystalline sodium acetate are then added and the mixture is cooled for one hour at 0° C. and is then filtered. The solid residue is washed thoroughly with water and dried at 60° C. It is crystallized from ethanol and there is thus obtained 2-amino - 5 - ethyl - 7 - methyl - s - triazolo - [2,3-c]-pyrimidine as a colorless crystalline solid, M.P. 197° C.

The 2-ethyl-6-hydrazino-4-methylpyrimidine used as a starting material may be obtained as follows: 57 parts of 6-chloro-2-ethyl-4-methylpyrimidine are dissolved in 160 parts of ethanol at 18–22° C. and the solution is added dropwise to a solution of 40 parts of hydrazine hydrate in 160 parts of boiling ethanol. The mixture is heated under reflux for 15½ hours and is then cooled at 0° C. The mixture is filtered and the filtrate is diluted with 80 parts of benzene and the mixture is evaporated to dryness. The solid residue is boiled with 250 parts of ethyl acetate and the suspension is filtered. The filtrate is cooled for one hour at 0° C. and the mixture is then filtered. The solid residue is washed with cold ethyl acetate, dried at 60° C. and is then crystallized from ethanol. There is thus obtained 2-ethyl-6-hydrazino-4-methylpyrimidine as a colorless crystalline solid, M.P. 150° C.

The 6-chloro-2-ethyl-4-methylpyrimidine used as starting material has a B.P. of 93° C./20 mm. and may be obtained by following the procedure described at the end of Example 2 and substituting an equivalent amount of 2-ethyl-6-hydroxy-4-methylpyrimidine for the 6-hydroxy-4-methyl-2-n-propylpyrimidine used therein.

*Example 2*

5 parts of 2 - amino - 7 - methyl-5-n-propyl-s-triazolo-[2,3-c]pyrimidine, 12.5 parts of acetic acid and 13.7 parts of acetic anhydride are mixed and kept at a temperature of 20° C. for 24 hours. The suspension so obtained is then cooled to 0° C. and filtered. The solid residue is washed with cold ethanol, and is then crystallized from ethanol. There is thus obtained 2-acetamido-7-methyl-5-n-propyl - s - triazolo - [2,3 - c]pyrimidine as a colorless crystalline solid, M.P. 174° C.

The 2 - amino-7-methyl-5-n-propyl-s-triazolo-[2,3-c]pyrimidine, used as starting material, may be obtained as follows:

5 parts of 6-hydrazino-4-methyl-2-n-propylpyrimidine are dissolved in 30 parts of 1-N aqueous hydrochloric acid at 25° C. A stream of cyanogen chloride, previously washed with water, is bubbled through the solution, which is maintained at 25–32° C. until 2 parts of the gas are absorbed. The resulting solution is sealed and allowed to stand for one hour at 18–22° C. Excess cyanogen chloride is then removed by evaporation under reduced pressure at 18–22° C. 10 parts of crystalline sodium acetate are then added and the mixture is cooled for one hour at 0° C. and is then filtered. The solid residue is washed thoroughly with water and is dried at 60° C. It is crystallized from ethanol and there is thus obtained 2-amino-7-methyl - 5 - n - propyl-s-triazolo-[2,3-c]-pyrimidine as a colorless crystalline solid, M.P. 169° C. It is characterised by having an infrared absorption spectrum (determined by the potassium bromide pressed disc technique) showing prominent absorption bands at 3320, 3180, 2950, 2910, 1650, 1630, 1550, 1528, 1500, 1430, 1380, 1350, 1325, 1265, 1206, 1168, 1120, 1030, 860, 840, 800, 770, 740 cm.$^{-1}$.

The 6-hydrazino-4-methyl-2-n-propylpyrimidine used as starting material may be obtained as follows: 10 parts of 6-chloro-4-methyl-2-n-propylpyrimidine are dissolved in 13 parts of ethanol at 18–22° C. and the solution is added dropwise to a solution of 6.5 parts of hydrazine hydrate in 13 parts of boiling ethanol. The mixture is heated under reflux for 16 hours and is then cooled at 0° C. The mixture is filtered and the filtrate is diluted with 10 parts of benzene and the mixture is evaporated to dryness. The residue is extracted with 100 parts of ethyl acetate at 18–22° C., the suspension is filtered and the filtrate is evaporated to dryness. The solid residue is crystallized from a mixture of ethyl acetate and petroleum ether (B.P. 40–60° C.). There is thus obtained 6-hydrazino-4-methyl-2-n-propylpyrimidine as a colorless crystalline solid, M.P. 87° C.

The 6-chloro-4-methyl-2-n-propylpyrimidine used as starting material may be obtained as follows: 88 parts of 6-hydroxy-4-methyl-2-n-propylpyrimidine are added to 330 parts of phosphorus oxychloride and the mixture is heated gently under reflux for 3¾ hours at 150° C. The clear solution is allowed to cool slightly and then evaporated to half-volume under reduced pressure. The residual solution is cooled to 18–22° C. and is then poured slowly into a well stirred mixture of 1000 parts of ice and 300 parts of 40% aqueous sodium hydroxide solution. When the addition is complete the mixture is stirred for one hour and is then extracted three times using 500 parts of chloroform each time. The chloroform extracts are combined and washed with 100 parts of ice-water, dried over anhydrous magnesium sulphate and finally evaporated at 60° C. and 24 mm. pressure. The residual brown oil is then distilled under reduced pressure and there is thus obtained 6-chloro-4-methyl-2-n-propylpyrimidine, as a pale yellow oil, B.P. 108–110° C./24 mm.

*Example 3*

20 parts of 2-acetamido-7-methyl-5-n-propyl-s-triazolo-[2,3-c]-pyrimidine and 20 parts of lactose are passed through a 20 mesh screen, mixed and granulated with a sufficient quantity of water. The granules are dried in a current of warm air, screened to break down aggregates, and then filled into hard gelatin capsules so that each capsule contains the desired weight of the active ingredient. In this way capsules each containing 20 mg., 50 mg. or 100 mg. of the active ingredient are obtained and are suitable for use for therapeutic purposes.

*Example 4*

1.91 parts of 2-amino-7-methyl-5-n-propyl-s-triazolo-[2,3-c]-pyrimidine and 10 parts of 98% formic acid are heated under reflux for 1 hour. The solution is evaporated to dryness under reduced pressure and the residue so obtained is crystallized twice from ethanol. There is thus obtained 2-formamido-7-methyl - 5 - n - propyl-s-triazolo-[2,3-c]-pyrimidine, M.P. 189–190° C.

*Example 5*

159 parts of 2-amino-7-methyl-5-n-propyl-s-triazolo-[2,3-c]pyrimidine, 400 parts of acetic acid and 176 parts of acetic anhydride are heated under reflux for 30 minutes. The solution is cooled, first at 18–22° C. and then in ice-water and the resulting mixture is filtered. The solid residue is washed with ice-cold ethanol and is then crystallized from ethanol. There is thus obtained 2-acetamido-7-methyl-5-n-propyl-s-triazolo - [2,3-c]pyrimidine, M.P. 174° C.

*Example 6*

2 parts of 2-amino-7-methyl-5-n-propyl-s-triazolo-[2,3-c]pyrimidine and 11 parts of acetic anhydride are heated under reflux for 30 minutes. The solution is cooled in ice-water and the mixture is filtered. The solid residue is crystallized from ethanol and there is thus obtained 2-acetamido-7-methyl-5-n-propyl-s-triazolo-[2,3 - c]pyrimidine, M.P. 174° C.

*Example 7*

The process described in Example 6 is repeated using 0.5 part of 2-amino-5,7-dimethyl-s-triazolo-[2,3-c]pyrimidine and 27.5 parts of acetic anhydride. There is thus obtained 2 - acetamido-5,7-dimethyl-s-triazolo-[2,3-c]pyrimidine, M.P. 252–254° C. (from ethanol).

*Example 8*

1.91 parts of 2-amino-7-methyl-5-n-propyl-s-triazolo-[2,3-c]pyrimidine, 5 parts of acetic acid and 1.2 parts of acetyl chloride are heated under reflux for 30 minutes. The solution is cooled in ice-water and the mixture is filtered. The solid residue is washed with cold ethanol and crystallized from ethanol. There is thus obtained 2-acetamido-7-methyl-5-n-propyl-s-triazolo - [2,3 - c]pyrimidine, M.P. 174° C.

*Example 9*

2 parts of 2-amino-7-methyl-5-n-propyl-s-triazolo-[2,3-c]pyrimidine, 5 parts of propionic acid and 2 parts of propionic anhydride are heated under reflux for 30 minutes. The solution is cooled and the solid precipitate is recovered by filtration and crystallized from ethanol. There is thus obtained 2-propionamido-7-methyl-5-n-propyl-s-triazolo[2,3-c]pyrimidine, M.P. 170–171° C.

*Example 10*

2 parts of 2-amino-7-methyl-5-n-propyl-s-triazolo-[2,3-c]pyrimidine and 5 parts of n-butyric anhydride are heated under reflux for 30 minutes. The solution is cooled to 18–22° C., diluted with ethanol and kept at 0° C. for 18 hours. The solid precipitate is recovered by filtration, washed with ethanol and is crystallized from ethanol. There is thus obtained 2-n-butyramido-7-methyl-5-n-propyl-s-triazolo-[2,3-c]pyrimidine, M.P. 160–161° C.

*Example 11*

3.8 parts of 2-amino-7-methyl-5-n-propyl-s-triazolo-[2,3--c]pyrimidine, 5 parts of dry pyrimidine and 2.35 parts of isobutyryl chloride are heated at 95–100° C. for 2 hours and then cooled to 18–22° C. and poured into ice. The precipitate is recovered by filtration, washed with ice-water, dried at 60° C. and is crystallized from ethyl acetate. There is thus obtained 2-isobutyramido-7-methyl - 5 - n - propyl-s-triazolo - [2,3-c]pyrimidine, M.P. 156–157° C.

*Example 12*

3.8 parts of 2-amino-7-methyl-5-n-propyl-s-triazolo-[2,3-c]pyrimidine, 5 parts of dry pyridine and 2.2 parts of pivalyl chloride are heated at 95–100° C. for 2 hours and then cooled to 18–22° C. 20 parts of water and 5 parts of acetic acid are added and the suspension is cooled at 0° C. for 30 minutes. The solid residue is recovered by filtration, washed with ice-water, dried at 50° C. and is crystallized from a mixture of 8 parts of ethanol and 5 parts of water. There is thus obtained 2-pivalamido-7-methyl-5-n-propyl-s-triazolo - [2,3-c]pyrimidine, M.P. 170–171° C.

*Example 13*

1.91 parts of 2-amino-7-methyl-5-n-propyl-s-triazolo-[2,3-c]pyrimidine, 5 parts of dry pyridine and 3 parts of stearylchloride are heated in an oil-bath for 3 hours at 120° C. The solution is then cooled to 18–22° C. and is poured into ice. The solid residue is recovered by filtration, washed with ice-water, dried in an evacuated desiccator at 18–22° C. and is then crystallized from ethyl acetate. There is thus obtained 2-stearamido-7-methyl-5-n-propyl-s-triazolo-[2,3-c]pyrimidine, M.P. 90–92° C.

*Example 14*

1 part of 2-amino-7-methyl-5-n-propyl-s-triazolo-[2,3-c]pyrimidine and 2 parts of trifluoroacetic anhydride are heated under reflux for 15 minutes. The mixture is cooled to 18–22° C. and diluted with ethanol and then cooled at 0° C. The resulting precipitate is recovered by filtration, and is crystallized from ether. There is thus obtained 2 - trifluoroacetamido-7-methyl-5-n-propyl-s-triazolo-[2,3-c]pyrimidine, M.P. 154–156° C.

*Example 15*

The process described in Example 11 is repeated except that there are used as starting materials 5 parts of 2-amino-7-methyl-5-n-propyl-s-triazolo - [2,3-c]pyrimidine, 25 parts of dry pyridine and 4.6 parts of benzoyl chloride and there is thus obtained 2-benzamido-7-methyl-5-n-propyl-s-triazolo-[2,3-c]pyrimidine, M.P. 149–150° C. (from ethanol). In a similar manner from 1.91 parts of 2-amino-7-methyl-5-n-propyl-s-triazolo - [2,3-c]pyrimidine, 10 parts of dry pyridine and 2.23 parts of m-nitrobenzoyl chloride there is obtained 2-m-nitrobenzamido-7-methyl-5-n-propyl-s-triazolo - [2,3 - c]pyrimidine, M.P. 156–157° C. (ethanol); from 1 part of 2-amino-7-methyl-5-n-propyl-s-triazolo[2,3-c]pyrimidine, 5 parts of dry pyridine and 1.23 parts of 3,4,5-trimethoxybenzoyl chloride there is obtained 2-(3′,4′,5′-trimethoxybenzamido)-7-methyl-5-n-propyl-s-triazolo-[2,3-c]pyridine, M.P. 148–149° C. (ethanol); from 1 part of 2-amino-7-methyl-5-n-propyl-s-triazolo-[2,3-c]pyrimidine, 5 parts of dry pyridine and 1.46 parts of ethyl chloroformate heated for 1 hour at 95–100° C. there is obtained 2-ethoxycarbonylamino-7-methyl-5-n-propyl - s - triazolo - [2,3 - c]pyrimidine, M.P. 184–185° C. (ethanol); from 1 part of 2-amino-5,7-di-methyl-s-triazolo-[2,3-c]pyrimidine, 10 parts of dry pyridine and 1.1 parts of benzoyl chloride, there is obtained 2-benzamido-5,7-dimethyl-s-triazolo - [2,3 - c]pyrimidine, M.P. 236–238° C. (from ethanol); from 4.8 parts of 2-amino-7-methyl-5-n-propyl-s-triazolo-[2,3-c]pyrimidine, 24 parts of dry pyridine and 5.1 parts of phenoxyacetyl chloride, there is obtained 2-phenoxyacetamido-7-methyl-5-n-propyl-s-triazolo-[2,3-c]pyrimidine, M.P. 170–172° C. (from ethanol).

*Example 16*

2 parts of 2-amino-7-methyl-5-n-propyl-s-triazolo-[2,3-c]pyrimidine and 5 parts of benzoic anhydride are heated in an oil bath at 160–180° C. for 1 hour. The benzoic acid is removed by sublimation and the residue is crystallized twice from ethanol. There is thus obtained 2-benzamido - 7 - methyl - 5 - n - propyl - s - triazolo - [2,3-c]pyrimidine, M.P. 149–150° C.

*Example 17*

1 part of 2-amino-7-methyl-5-n-propyl-s-triazolo-[2,3-c]pyrimidine, 10 parts of dry dioxan and 0.51 part of maleic anhydride are heated under reflux for 2 hours. The solution is evaporated to half-volume, diluted with 10 parts of ethyl acetate and cooled at 0° C. for 18 hours. The solid precipitate is recovered by filtration and crystallized from ethyl acetate. There is thus obtained 2-(2′-carboxyacrylamido) - 7 - methyl - 5 - n - propyl - s - triazolo-[2,3-c]pyrimidine, M.P. 170–171° C.

*Example 18*

1.2 parts of 2-amino-7-methyl-5-n-propyl-s-triazolo-[2,3-c]pyrimidine, 2 parts of pyridine and 1.4 parts of cinnamoyl chloride are heated at 95–100° C. for two hours. The solution is cooled to 18–22° C. and triturated twice with a solution of 10 parts of water and 2.5 parts of acetic acid. The aqueous phase is removed by decantation and the residue is warmed to 45° C. with 10 parts of water and the mixture is filtered. The solid residue is washed with water, dried in air and crystallized first from ethyl acetate and then from butanol. There is thus obtained 2-cinnamamido-7-methyl-5-n-propyl-s-triazolo-[2,3-c]pyrimidine, M.P. 191–192° C.

*Example 19*

The process described in Example 5 is repeated except that there are used as starting materials 4 parts of 2 - amino - 5,7 - di - n - propyl - s - triazolo - [2,3-c]pyrimidine, 12.5 parts of acetic acid and 4.4 parts of acetic anhydride. There is obtained 2-acetamido-5,7-di-n-propyl - s - triazolo - [2,3 - c]pyrimidine, M.P. 161–162° C. (ethanol).

In a similar manner, from 1 part of 2-amino-7-n-heptyl-5 - n - propyl - s - triazolo - [2,3 - c]pyrimidine, 2.5 parts of acetic acid and 1.1 parts of acetic anhydride, there is obtained 2 - acetamido - 7 - n - heptyl - 5 - n - propyl - s-triazolo-[2,3-c]pyrimidine, M.P. 112–114° C. (ethyl acetate); from 2 parts of 2-amino-7-methyl-5-n-pentyl-s-triazolo-[2,3-c]pyrimidine, 5 parts of acetic acid and 2.2 parts of acetic anhydride there is obtained 2-acetamido-7-methyl-5-n-pentyl-s-triazolo-[2,3-c]pyrimidine, M.P. 154° C. (ethyl acetate); from 0.65 part of 8-allyl-2-amino-7-methyl-5-n-propyl-s-triazolo - [2,3-c]pyrimidine monohydrate, 2.1 parts of acetic acid and 0.71 part of acetic anhydride there is obtained 2-acetamido-8-allyl-7-methyl-5-n-propyl-s-triazolo-[2,3-c]pyrimidine, M.P. 99–100° C.; [2,3-c]pyrimidine, 5 parts of acetic acid and 2.2 parts of from 2 parts of 2 - amino - 5 - ethylthio - 7 - methyl-s - triazolo - [2,3 - c]pyrimidine, 5 parts of acetic acid and 2.2 parts of acetic anhydride there is obtained 2 - acetamido - 5 - ethylthio - 7 - methyl - s-triazolo - [2,3 - c]pyrimidine, M.P. 222° C. (from ethanol); from 0.5 part of 2-amino-7-chloro-5-n-propyl-s-triazolo-[2,3-c]pyrimidine, 2 parts of acetic acid and 0.55 part of acetic anhydride there is obtained 2-acetamido-7-chloro - 5 - n - propyl - s - triazolo - [2,3-c]pyrimidine, M.P. 186–187° C. (from ethyl acetate) and from 1 part of 2 - amino - 8 - bromo - 7 - methyl - 5 - n - propyl - s-triazolo-[2,3-c]pyrimidine, 2.5 parts of acetic acid and 1.1 parts of acetic anhydride, there is obtained 2-acetamido - 8 - bromo - 7 - methyl - 5 - n -propyl - s - triazolo-[2,3-c]pyrimidine, M.P. 154° C. (from ethyl acetate).

*Example 20*

0.15 part of 2-amino-5-methyl-7,8-tetramethyleno-s-triazolo-[2,3-c]pyrimidine and 0.27 part of acetic anhydride are heated under reflux for 1 hour. The solution is then cooled to 18–22° C., 3 parts of water are added followed by excess of ammonium hydroxide and the suspension so obtained is cooled at 0° C. The solid precipitate is recovered by filtration, washed with water, dried at 100° C. and crystallized from ethanol. There is thus obtained 2 - acetamido - 5 - methyl - 7,8 - tetramethyleno-s-triazolo-[2,3-c]pyrimidine, M.P. 224–225° C.

*Example 21*

1 part of 2-amino-5-n-propyl-7-trifluoro-methyl-s-triazolo-[2,3-c]pyrimidine, 2 parts of pyridine, and 0.7 part of pivalyl chloride are heated at 95–100° C. for 30 minutes. The solution is cooled, 10 parts of water are added and the mixture is filtered. The solid residue is dried in an evacuated desiccator and is then crystallized from petroleum ether (B.P. 80–100° C.). There is thus obtained 2 - pivalamido - 5 - n - propyl - 7 - trifluoromethyl - s - triazolo - [2,3-c]pyrimidine, M.P. 152–153° C.

*Example 22*

1 part of 2-acetamido-7-methyl-5-n-propyl-s-triazolo-[2,3-c]pyrimidine is dissolved in a solution of 0.174 part of sodium hydroxide in 4 parts of ethanol at 18–22° C. The yellow solution is cooled at 0° C. and the resulting solid precipitate is recovered by filtration and is crystallized from ethanol. There is thus obtained the sodium salt of 2-acetamido-7-methyl-5-n-propyl-s-triazolo-[2,3-c]-pyrimidine, as a colorless solid, M.P. 236–238° C.

Example 23

3 parts of 2-amino-5,7-di-n-propyl-s-triazolo-[2,3-c]pyrimidine, 10 parts of propionic acid and 3 parts of propionic anhydride are heated under reflux for 30 minutes. The solution is evaporated under reduced pressure and ice is added to the residue. The solid precipitate is recovered by filtration, washed with ice-water, dried at 60° C. and is crystallized twice from ethanol. There is thus obtained 2 - propionamido - 5,7 - di - n - propyl - s - triazolo - [2,3-c]pyrimidine, M.P. 133–134° C.

Example 24

0.35 part of 2-amino-7-methyl-5,8-di-n-propyl-s-triazolo-[2,3-c]pyrimidine, 0.7 part of acetic acid and 0.39 part of acetic anhydride are heated under reflux for 30 minutes. The mixture is cooled in ice-water and 5 parts of ethanol are added. The solution is then evaporated under reduced pressure and the residue is crystallized from a mixture of ether and petroleum ether (B.P. 40–60° C.). There is thus obtained 2-acetamido-7-methyl-5,8-di-n-propyl-s-triazolo-[2,3-c]pyrimidine acetate, as a colorless crystalline solid M.P. 75–76° C.

Example 25

0.06 g. of 2-acetamido-7-methyl-5-n-propyl-s-triazolo-[2,3-c]pyrimidine, 0.1 g. of methyl p-hydroxybenzoate and 0.1 g. of propyl p-hydroxybenzoate are dissolved in 20 g. of propylene glycol. To this solution are added 80 g. of commercial invert sugar syrup followed by 24.93 g. of water. There is thus obtained a syrup which is suitable for paediatric use, a 3.5 cc. teaspoonful of syrup containing about 2 mg. of active ingredient. The syrup may additionally contain a flavoring agent in order to provide a more palatable preparation.

Example 26

0.06 g. of 2-acetamido-7-methyl-5-n-propyl-s-triazolo-[2,3-c]pyrimidine is dissolved in 10 g. of propylene glycol and to this solution are added 89.94 parts of water. There is thus obtained an oral preparation which can be used conveniently as a throat spray.

Example 27

0.1 g. of 2-acetamido-7-methyl-5'-n-propyl-s-triazolo-[2,3-c]pyrimidine is intimately mixed with 100 g. of lactose. There is thus obtained a powdered preparation which can be used for insufflation. The lactose can be replaced by calcium phosphate and there is likewise obtained a powdered preparation suitable for insufflation.

Example 28

A mixture of 10 parts of 2-acetamido-7-methyl-5-n-propyl-s-triazolo-[2,3-c]pyrimidine, 75 parts of lactose and 22 parts of maize starch is granulated with a sufficient quantity of 10% maize starch paste and the moist mass so obtained is passed through a No. 12 mesh screen. The granules so obtained are dried in a current of air at 65° C. and are then passed through a No. 16 mesh screen to break down aggregates, 1 part of magnesium stearate is added and the mixture is then compressed into tablets containing the desired weight of active ingredient. Tablets containing 10 mg. or 20 mg. of active ingredient are suitable for therapeutic purposes.

Example 29

A mixture of 10 parts of 2-acetamido-7-methyl-5-n-propyl-s-triazolo[2,3-c]pyrimidine, 75 parts of lactose, 24 parts of maize starch and 1 part of magnesium stearate is compressed into slugs in a conventional slugging machine. The slugs so obtained are broken down by passage through a series of sieves of size No. 8, No. 12 and No. 16. The material thus obtained is then compressed into tablets containing the desired weight of active ingredient. Tablets containing 10 mg. or 20 mg. of active ingredient are suitable for therapeutic purposes.

Example 30

To a solution of 0.15 part of 2-acetamido-7-methyl-5-n-propyl-s-triazolo-[2,3-c]pyrimidine in 13.35 parts of ethanol are added 1.5 parts of propylene glycol, 42.5 parts of dichlorodifluoromethane and 42.5 parts of dichlorotetrafluoroethane. The cooled mixture so obtained is filled into a container fitted with a suitable device for delivering the solution as a very fine spray when required. There is thus obtained an aerosol formulation which can be used for therapeutic purposes.

Example 31

20 parts of 2-acetamido-7-methyl-5-n-propyl-s-triazolo-[2,3-c]pyrimidine are mixed with 100 parts of arachis oil in a suitable mixing machine and the product so obtained is filled into soft gelatine capsules each containing the desired weight of active ingredient. There are thus obtained soft capsules which may contain 10, 20, 50 or 100 mg. of active ingredient and are suitable for therapeutic use.

The arachis oil may be replaced by either olive oil or liquid paraffin and there are likewise obtained soft capsules suitable for therapeutic use.

Example 32

Granules containing 10 parts of 2-acetamido-7-methyl-5-n-propyl-s-triazolo-[2,3-c]pyrimidine, 75 parts of lactose, 22 parts of maize starch and 1 part of magnesium stearate are prepared according to the process as described in Example 28. These granules are compressed using deep concave or "sugar coating" punches such that each tablet contains the desired amount of active ingredient. The tablets so obtained are transferred to a coating pan and in a conventional manner, successive coats of enteric material are applied to the tablets using a coating solution prepared from 1 part of cetyl alcohol, 1 part of stearic acid, 2 parts of orange shellac and 6 parts of ethanol. A dusting powder made up from equal parts of talc and stearic acid is used to prevent adhesion of the tablets during the drying period of each coat of enteric material. Ten or more coats of enteric material are applied to each tablet until a sample conforms to the established test for enteric coated tablets. There are thus obtained enteric coated tablets which may contain 10, 20, 50 or 100 mg. of active ingredient and are suitable for therapeutic use. The said enteric coated tablets may additionally be sugar coated, if desired, in order to improve their appearance.

The coating solution described above may be replaced by a coating solution prepared from 42.5 parts of ethyl acetate, 42.5 parts of isopropyl alcohol, 12 parts of cellulose acetate phthalate and 3 parts of diethyl phthalate. There are likewise obtained enteric coated tablets which are suitable for therapeutic purposes.

Example 33

Granules containing 10 parts of 2-acetamido-7-methyl-5'-n-propyl-s-triazolo-[2,3-c]pyrimidine, 75 parts of lactose, 22 parts of maize starch and 1 part of magnesium stearate are prepared according to the process as described in Example 28. These granules are compressed using deep concave or "sugar coating" punches such that each tablet contains the desired amount of active ingredient. The tablets so obtained are transferred to a coating pan and a sealing coat is applied to them using a solution prepared from 20 parts of white beeswax in 80 parts of petroleum ether (B.P. 120–140° C.). The tablets are then coated in the conventional manner with a mixture prepared from 100 parts of sugar, 1.5 parts of liquid glucose and 40 parts of water until several coats of sugar have been applied. The said mixture may also contain an edible dyestuff or calcined iron oxide, if desired, in order to colour the sugar coating. When the tablets are adequately sugar coated, they are polished by application of a solution of white beeswax in petroleum ether according to the known art. There are thus obtained sugar coated tablets which may contain 10, 20, 50 or 100 mg. of active ingredient and are suitable for therapeutic use.

*Example 34*

5.7 parts of 2-amino-7-methyl-5-n-propyl-s-triazolo-[2,3-c]pyrimidine, 3 parts of acetyl chloride and 50 parts of chloroform are heated together under reflux for 1 hour. The mixture is then evaporated to dryness under reduced pressure. The residue so obtained is 2-acetamido-7-methyl - 5 - n - propyl-s-triazolo-[2,3-c]pyrimidine, M.P. 174° C.

What we claim is:

1. A pyrimidine derivative selected from the group consisting of compounds of the formulae:

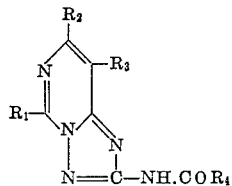

and

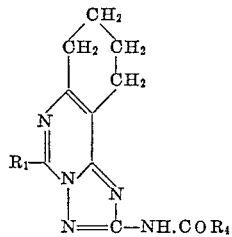

wherein $R_1$, $R_2$ and $R_3$ are selected from the group consisting of hydrogen, alkyl of not more than 7 carbon atoms, halogenoalkyl of not more than 7 carbon atoms, alkoxyalkyl of not more than 9 carbon atoms, allyl, cyclohexyl, methylthio, ethylthio and halogen, and wherein $R_4$ is selected from the group consisting of hydrogen, alkyl of not more than 17 carbon atoms, phenoxymethyl, trifluoromethyl, methoxy, ethoxy, phenyl, nitrophenyl, trimethoxyphenyl, β-carboxyvinyl and β-phenylvinyl, and the non-toxic salts thereof with strong bases.

2. 2 - acetamido-7-methyl-5-n-propyl-s-triazolo-[2,3-c] pyrimidine.

3. 2 - formamido-7-methyl-5-n-propyl-s-triazolo-[2,3-c] pyrimidine.

4. 2-propionamido-7-methyl-5-n-propyl-s-triazolo-[2,3-c]pyrimidine.

5. 2-benzamido-7-methyl-5-n-propyl-s-triazolo-[2,3-c] pyrimidine.

6. 2 - ethoxycarbonylamino-7-methyl-5-n-propyl-s-triazolo-[2,3-c]pyrimidine.

7. 2-acetamido-5:7-di-n-propyl-s-triazolo-[2,3-c]pyrimidine.

References Cited in the file of this patent
UNITED STATES PATENTS

| | | |
|---|---|---|
| 2,731,465 | Schroeder | Jan. 17, 1956 |
| 2,781,344 | Comte | Feb. 12, 1957 |
| 2,866,734 | Shapiro | Dec. 30, 1958 |
| 2,868,689 | Florestano et al. | Jan. 13, 1959 |
| 2,874,157 | Traverso et al. | Feb. 17, 1959 |